United States Patent
Zhou

[19]

[11] Patent Number: 6,161,836
[45] Date of Patent: Dec. 19, 2000

[54] BRUSH SEAL AND ROTARY MACHINE CONTAINING SUCH BRUSH SEAL

[75] Inventor: Ming Zhou, Niskayuna, N.Y.

[73] Assignee: General Electric Company, Schenectady, N.Y.

[21] Appl. No.: 09/139,869

[22] Filed: Aug. 25, 1998

[51] Int. Cl.⁷ .................................................... F16J 15/44
[52] U.S. Cl. ............................................................ 277/355
[58] Field of Search .................................. 277/355, 503, 277/504, 505, 507, 508

[56] References Cited

U.S. PATENT DOCUMENTS

| | | |
|---|---|---|
| 4,436,311 | 3/1984 | Brandon . |
| 5,002,288 | 3/1991 | Morrison et al. . |
| 5,066,024 | 11/1991 | Reisinger et al. ........................ 277/355 |
| 5,176,389 | 1/1993 | Noone et al. ............................ 277/355 |
| 5,351,971 | 10/1994 | Short ...................................... 277/355 |
| 5,395,124 | 3/1995 | Brandon . |
| 5,464,226 | 11/1995 | Dalton . |
| 5,474,305 | 12/1995 | Flower ..................................... 277/355 |
| 5,487,549 | 1/1996 | Dalton et al. . |
| 5,568,931 | 10/1996 | Tseng et al. ............................. 277/355 |
| 5,944,320 | 8/1999 | Werner et al. ........................... 277/355 |

*Primary Examiner*—B. Dayoan
*Assistant Examiner*—Karlena Schwing
*Attorney, Agent, or Firm*—Patrick K. Patnode; Marvin Snyder

[57] ABSTRACT

A brush-seal bristle assembly, a brush seal segment containing such assembly, and a rotary machine (such as a steam or gas turbine) containing such segment. The machine has a rotor, a stator casing, and the segment. The segment has a housing and the assembly. The assembly has bristles and a bristle holder. The fixed ends of the bristles are fixedly-attached to the bristle holder, the bristle holder is rotatably-attached to the housing, and the housing is positioned in a channel of the casing. In one example, a spring rotationally biases the bristle holder to a second position to avoid unwanted bristle-rotor contact during machine startup or shutdown. Then, fluid pressure generated by the machine during steady-state operation overcomes the spring bias and rotationally biases the bristle holder to a first position wherein the bristle free ends are closer to the rotor for proper sealing.

12 Claims, 3 Drawing Sheets

BRUSH SEAL AND ROTARY MACHINE CONTAINING SUCH BRUSH SEAL

FIELD OF THE INVENTION

The present invention relates generally to seals, and more particularly to a brush seal for a rotary machine.

BACKGROUND OF THE INVENTION

Rotary machines include, without limitation, turbines for steam turbines and compressors and turbines for gas turbines. A steam turbine has a steam path which typically includes, in serial-flow relationship, a steam inlet, a turbine, and a steam outlet. A gas turbine has a gas path which typically includes, in serial-flow relationship, an air intake (or inlet), a compressor, a combustor, a turbine, and a gas outlet (or exhaust nozzle). Gas or steam leakage, either out of the gas or steam path or into the gas or steam path, from an area of higher pressure to an area of lower pressure, is generally undesirable. For example, gas-path leakage in the turbine or compressor area of a gas turbine, between the rotor of the turbine or compressor and the circumferentially surrounding turbine or compressor casing, will lower the efficiency of the gas turbine leading to increased fuel costs. Also, steam-path leakage in the turbine area of a steam turbine, between the rotor of the turbine and the circumferentially surrounding casing, will lower the efficiency of the steam turbine leading to increased fuel costs.

Annular brush seals have been proposed for use between a rotor and a surrounding casing in gas and steam turbines. The annular brush seal includes an annular backing plate and also includes bristles which are canted at typically a forty-five degree angle with respect to a radius line. A gas or steam turbine brush seal is made up of circumferentially-arrayed brush seal segments. Radial contact of the bristles with the rotor during turbine startup or shutdown causes unwanted wear and/or damage of the bristle free ends and also causes unwanted perturbations in the rotor itself.

It is known to position variable-clearance labyrinth-seal segments in a circumferential array between the rotor of the turbine and the circumferentially surrounding casing to minimize steam-path leakage. The ends of coil springs engage circumferentially-opposing and generally-matching holes in circumferentially-adjacent seal segments. The coil springs circumferentially urge apart circumferentially-adjacent seal segments. Such circumferentially-urging-apart causes the seal segments to move radially outward within a channel in the casing. This prevents damage to the labyrinth-seal teeth from transient radial movement of the rotor during turbine startup or shutdown. As the rotor reaches steady-state operating conditions, steam pressure builds up in the turbine, and such pressurized fluid enters the channel and pushes the seal segments radially inward such that the labyrinth-seal teeth are in close proximity to the rotor for more efficient sealing. Designs have been proposed which add brush-seal bristles to a labyrinth seal segment.

SUMMARY OF THE INVENTION

In a first exemplary embodiment, a brush seal segment of the invention includes a brush-seal housing, brush-seal bristles, and a bristle holder. The housing has a shape of generally an annular segment of a circular ring wherein the ring has a longitudinal axis. The bristles each have a fixed end and a free end. The fixed ends of the bristles are fixedly-attached to the bristle holder, and the bristle holder is rotatably-attached to the housing.

In a second exemplary embodiment, a brush-seal bristle assembly of the invention is for installation in a brush-seal housing having a shape of generally an annular segment of a circular ring, wherein the ring has a longitudinal axis. The brush-seal bristle assembly includes brush-seal bristles and a bristle holder. The bristles each have a fixed end and a free end. The fixed ends of the bristles are fixedly-attached to the bristle holder, and the bristle holder is rotatably-attachable to the housing.

In a third exemplary embodiment, a rotary machine of the invention includes a rotor, a casing, and a brush seal segment. The rotor has a longitudinal axis. The casing is generally coaxially aligned with the axis, circumferentially surrounds and is radially spaced apart from the rotor, and includes an inner circumferential channel generally coaxially aligned with and open to the rotor. The brush seal segment includes a brush-seal housing, brush-seal bristles, and a bristle holder. The housing has a shape of generally an annular segment of a circular ring which is generally coaxially aligned with the longitudinal axis. The bristles each have a fixed end and a free end. The fixed ends of the bristles are fixedly-attached to the bristle holder, and the bristle holder is rotatably-attached to the housing.

In one example, the bristle holder has an axis of rotation which lies in a plane which is generally perpendicular to the longitudinal axis. The rotation of the bristle holder about the axis of rotation is limited between first and second positions, wherein the free ends of the bristles are located closer to the longitudinal axis in the first position than in the second position. A spring contacts the bristle holder and the housing and rotationally biases the bristle holder towards the second position. Steady-state operation of the rotary machine generates fluid pressure which is exerted against the bristle holder or the bristles or both to overcome the spring rotational bias and to rotationally bias the bristle holder towards the first position.

Several benefits and advantages are derived from the invention. During steady-state operation of the rotary machine, fluid pressure overcomes the spring rotational bias and causes the bristle holder to rotate to the first position where the free ends of the brush-seal bristles are closest to the rotor to minimize leakage. During startup or shutdown of the rotary machine, when the fluid pressure is lower, the spring causes the bristle holder to rotate to the second position where the free ends of the brush-seal bristles are farthest from the rotor to avoid unwanted radial contact of the free ends of the bristles (i.e., wear and/or damage of the free ends of the bristles) with the rotor and to avoid unwanted perturbations in the rotor itself caused by such bristle-rotor contact.

DETAILED DESCRIPTION OF THE INVENTION

Figure 1:
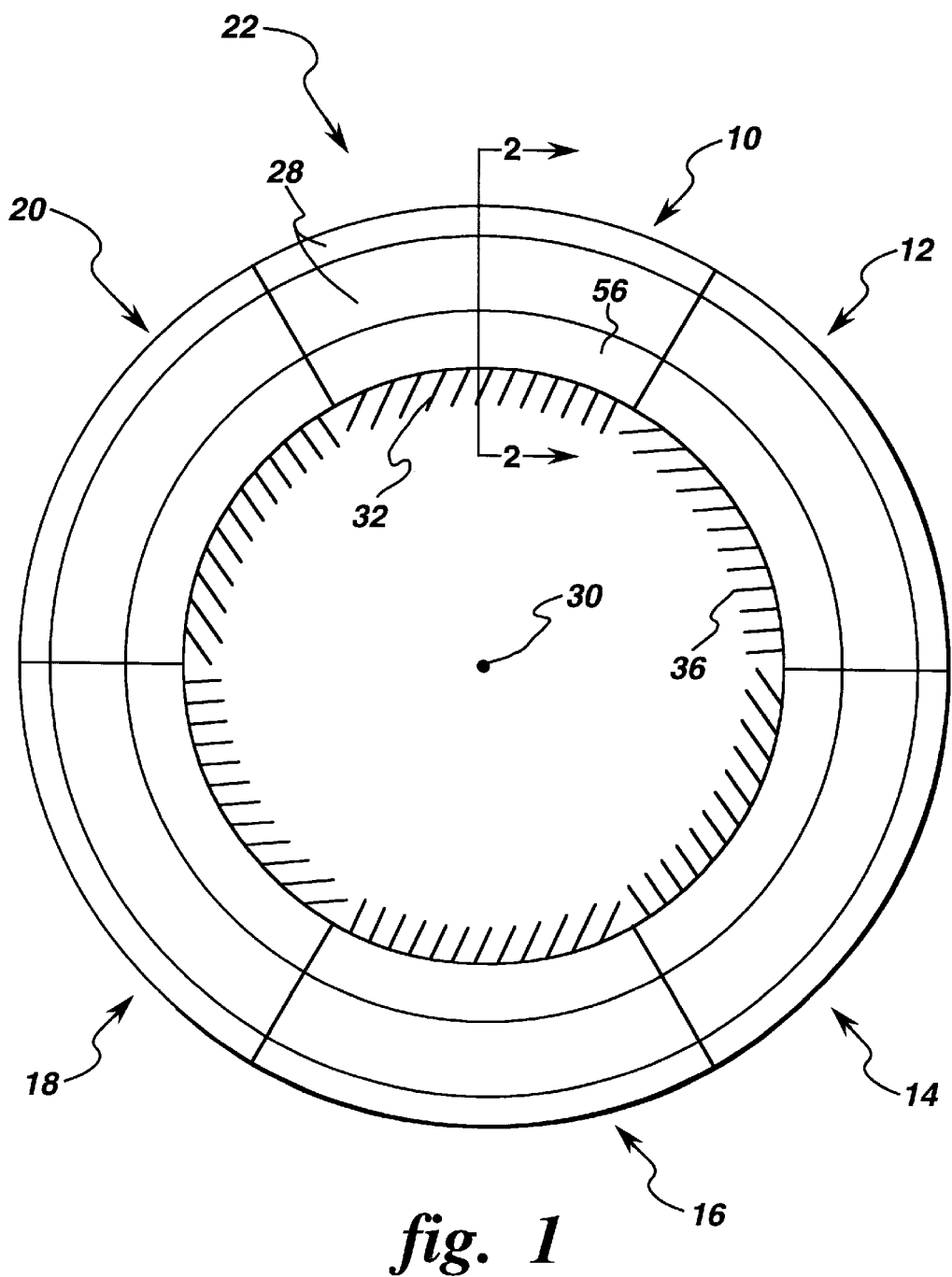
FIG. 1 is a schematic upstream-facing view of a first exemplary embodiment of a brush seal segment (including a brush-seal bristle assembly) of the invention shown circumferentially arrayed with other identical brush seal segments to define a brush seal.
Figure 2:
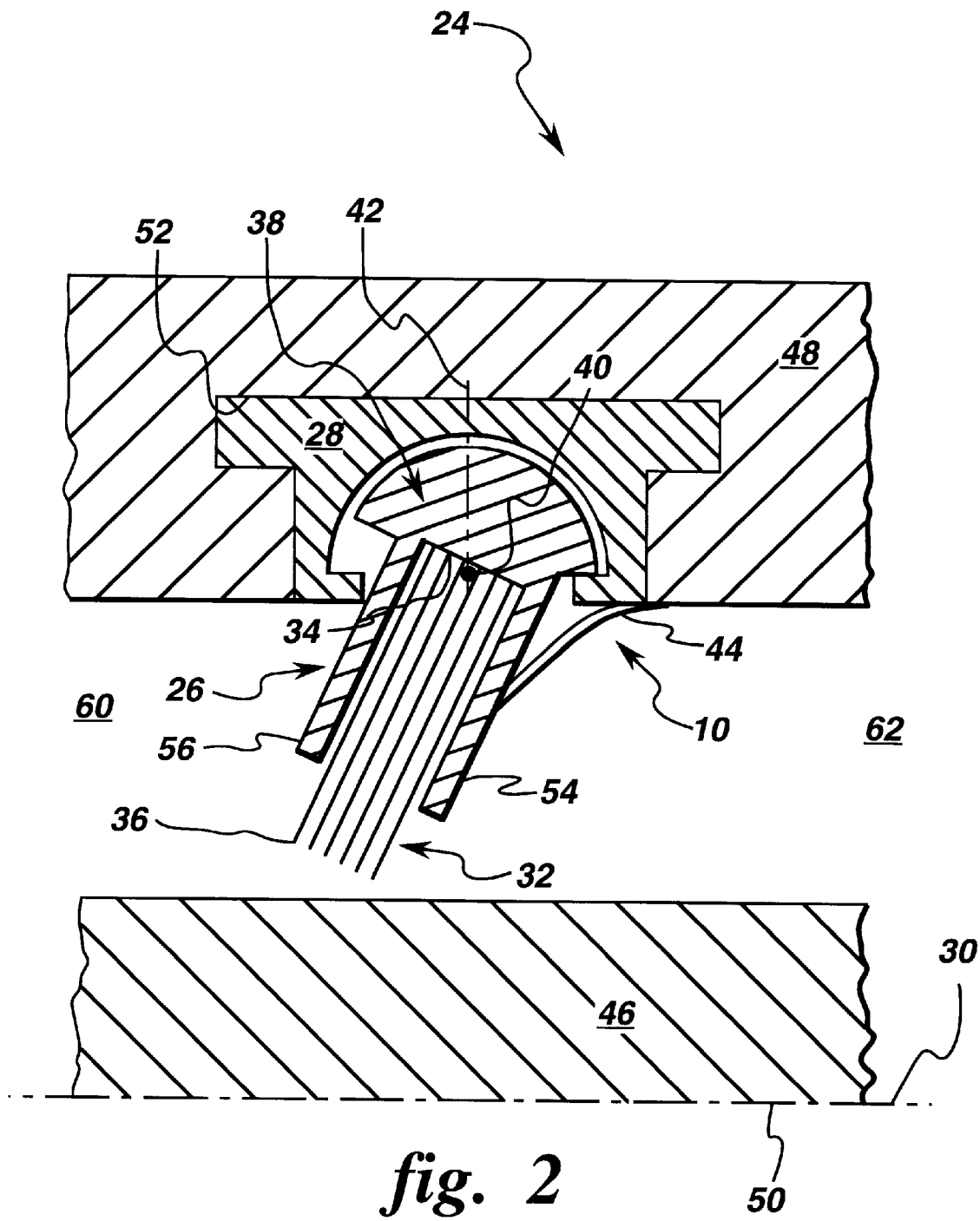
FIG. 2 is a cross-sectional view of one of the brush seal segments of FIG. 1 together with portions of a rotor and a stator casing of a rotary machine of the invention, wherein such cross-sectional view is taken along lines 2—2 of FIG. 1 and wherein the bristle holder is shown rotated to the second position.
Figure 3:
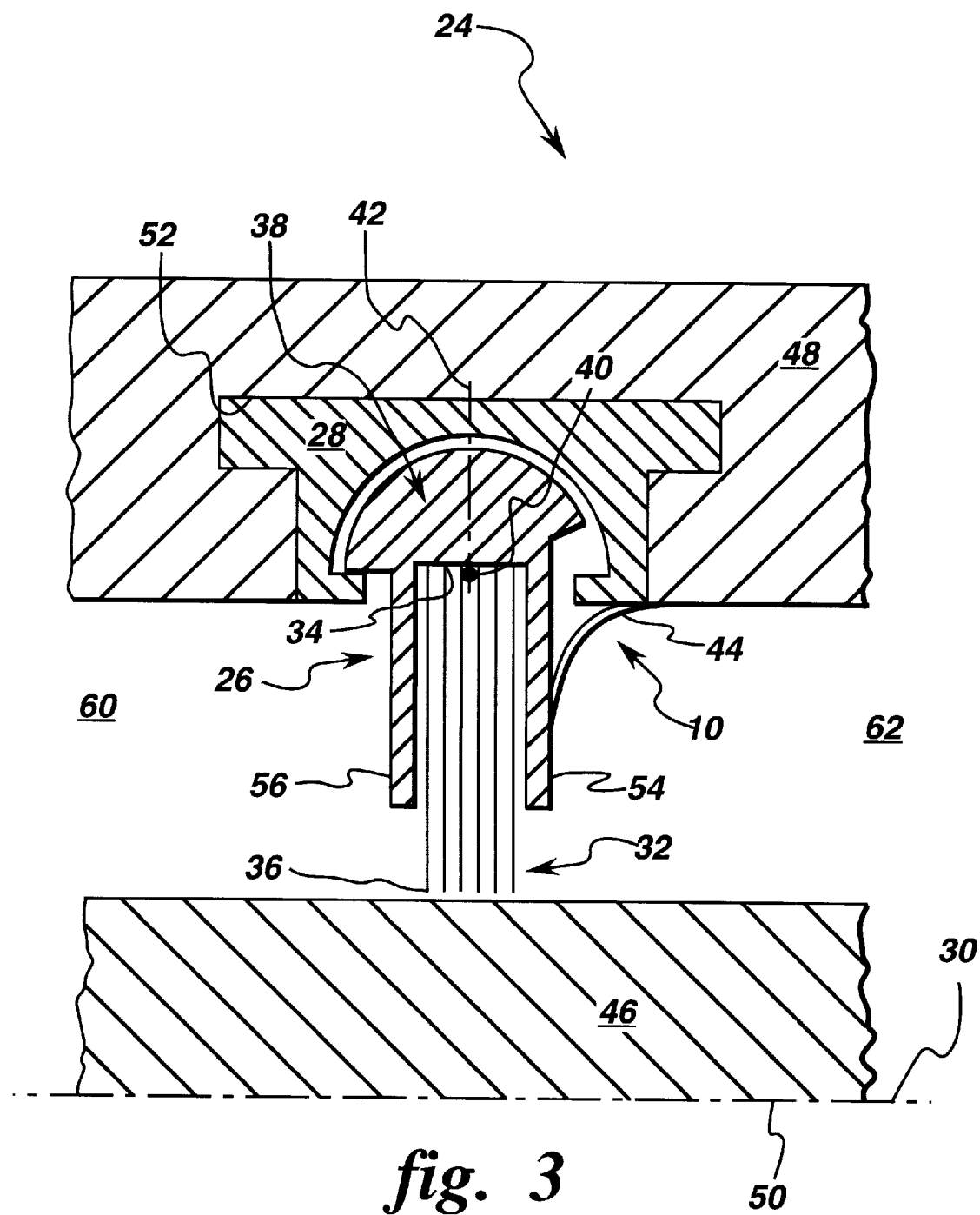
FIG. 3 is a view as in FIG. 2 but with the bristle holder shown rotated to the first position.

Referring now to the drawings, FIG. 1 schematically shows a first exemplary embodiment of a brush seal segment 10 of the present invention together with five other identical brush seal segments 12, 14, 16, 18, and 20 all circumferentially arrayed to define an annular brush seal 22. FIGS. 2 and 3 schematically show a portion of an example of a rotary machine 24 of the present invention containing installed brush seal segment 10, and such figures more clearly show an example of a brush-seal bristle assembly 26 of the present invention, such assembly 26 containing some of the elements of brush seal segment 10. Examples of rotary machines include, without limitation, a team turbine (including, together or individually, high, intermediate, and low pressure turbine sections) and a gas turbine (including, together or individually, compressors, and high and low pressure turbines).

The brush seal segment 10 of the present invention includes a brush-seal housing 28 having a shape of generally an annular segment of a circular ring (e.g., brush seal 22), wherein the ring (e.g., brush seal 22) has a longitudinal axis 30 (seen on end as a dot in FIG. 1 and seen as a dashed line in FIGS. 2 and 3). The brush seal segment 10 also includes a plurality of brush-seal bristles 32 each having a fixed end 34 and a free end 36. The bristles 32 typically consist essentially of metal-wire or ceramic-wire bristles such as, but not limited to, cobalt-based-alloy wire bristles. The brush seal segment 10 further includes a bristle holder 38. The fixed ends 34 of the bristles 32 are fixedly-attached to the bristle holder 38, and the bristle holder 38 is rotatably-attached to the housing 28. For purposes of describing the present invention, "fixedly-attached" means two members are attached so as not to allow relative displacement or relative rotation of the two members while they are attached together. Typically, the fixed ends 34 of metal-wire bristles 32 are fixedly attached to the bristle holder 38 by welding (such weldment being omitted from the figures for clarity). For purposes of describing the present invention, the term "welding" includes brazing.

In an exemplary construction, the bristle holder 38 has an axis of rotation 40 (shown as a dot in FIGS. 2 and 3) which lies in a plane 42 (shown on edge as a dashed line in FIGS. 2 and 3) which is generally perpendicular to the longitudinal axis 30. Here, the rotation of the bristle holder 38 about the axis of rotation 40 is limited between first and second positions, wherein the free ends 36 of the bristles 32 are disposed closer to the longitudinal axis 30 in the first position (as seen in FIG. 3) than in the second position (as seen in FIG. 2). In this construction, as seen in FIGS. 2 and 3, the brush seal segment 10 additionally includes a spring 44 which contacts the bristle holder 38 and the housing 28 and which biases the bristle holder 38 towards the second position, (as seen in FIG. 2). In one example, the spring 44 is attached to the housing 28 and slidingly-contacts the bristle holder 38.

The bristle holder 38 has been described as being rotatably-attached to the housing 28, and the housing 28 has been described as having a shape of generally an annular segment of a circular ring (e.g., brush seal 22). Constructional details of such rotatable attachment are left to the artisan, but the following examples are given for illustration. In one example, the bristle holder is a series of adjacent members each forming the "ball" of a ball-and-socket joint with a single curved groove in the housing forming the "socket" and with the groove shaped to confine rotational motion to between the first and second positions. In another example, the bristle holder is a single curved member disposed in a curved groove in the housing with the groove shaped to allow for ample clearance as the curved member rotates about a straight-line axis of rotation defined, for example, by the centers of two circles on the groove each having a low-clearance contact with the bristle holder, as can be designed and appreciated by those skilled in the art. It is noted that, in typical turbine seal applications, the angular distance between the first and second positions (i.e., the angle of rotation of the bristle holder) is small (e.g., eight to sixteen degrees) while still allowing for proper clearance between the free ends of the bristles and the rotor during startup or shutdown of the turbine.

The brush-seal bristle assembly 26 of the present invention is for installation in the previously-described housing 28 and includes the previously-described plurality of brush-seal bristles 32 and the previously-described bristle holder 38 with differences as hereinafter noted. For the assembly 26, the bristle holder 38 is described as being rotatably-attachable to the housing 28 instead of being described as being rotatably-attached to the housing 28. Also, for the assembly 26, the bristle holder 38 is described as having the previously-mentioned axis of rotation 40 when the bristle holder 38 is rotatably-attached to the housing 28.

The rotary machine 24 of the present invention includes a rotor 46, a stator casing 48, and a brush seal segment 10. FIG. 1 shows brush seal segment 10 circumferentially arrayed together with five other identical brush seal segments 12, 14, 16, 18, and 20 to define an annular brush seal 22. The rotor 46 has a longitudinal axis 50 (which is superimposed on previously-described longitudinal axis 30). The casing 48 is generally coaxially aligned with the longitudinal axis 50, circumferentially surrounds and is radially spaced apart from the rotor 46, and includes an inner circumferential channel 52 which is generally coaxially aligned with and open to the rotor 46. The brush seal segment 10 includes a brush-seal housing 28, a plurality of brush-seal bristles 32, and a bristle holder 38. The housing 28 has a shape of generally an annular segment of a circular ring (e.g., the brush seal 22), wherein the ring (e.g., the brush seal 22) is generally coaxially aligned with the longitudinal axis 50 and wherein the housing 28 is engagingly disposed in the channel 52. The bristles 32 each have a fixed end 34 and a free end 36. The fixed ends 34 of the bristles 32 are fixedly-attached to the bristle holder 38, and the bristle holder 38 is rotatably-attached to the housing 28.

Steady-state operation of the rotary machine 24 generates fluid pressure (such as steam in a steam turbine or compressed air or combustion gasses in a gas turbine) which is exerted against at least one of the bristle holder 38 and the plurality of bristles 32 to overcome the spring rotational bias and to rotationally bias the bristle holder 38 towards the first position (as seen in FIG. 3). In an exemplary construction, the bristle holder 38 has a backing plate 54 and an upstream plate 56, wherein the bristles 32 are disposed between the backing plate 54 and the upstream plate 56 and wherein the spring 44 contacts the backing plate 54. The upstream plate 56 is disposed such that steady-state operation of the rotary machine 24 generates fluid pressure which is exerted against the upstream plate 56 to overcome the spring rotational bias and to rotationally bias the bristle holder 38 towards the first position (as seen in FIG. 3). During steady-state operation of the rotary machine 24, the side of the upstream plate 56 opposite the bristles 32 faces a higher pressure region 60, and the side of the backing plate 54 opposite the bristles 32 faces a lower pressure region 62.

Thus, it is seen that during steady-state operation of the rotary machine 24, fluid pressure overcomes the spring rotational bias and causes the bristle holder 38 to rotate to the first position where the free ends 36 of the brush-seal bristles 32 are closest to the rotor 46 to minimize leakage.

During startup or shutdown of the rotary machine 24, when the fluid pressure is lower, the spring 44 causes the bristle holder 38 to rotate to the second position where the free ends 36 of the brush-seal bristles 32 are farthest from the rotor 46 to avoid unwanted radial contact of the free ends 36 of the bristles 32 (i.e., wear and/or damage of the free ends of the bristles) with the rotor 46 and to avoid unwanted perturbations in the rotor 46 itself caused by such bristle-rotor contact.

The foregoing description of several exemplary embodiments of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

What is claimed is:

1. A brush seal segment comprising:
   a) a brush-seal housing having a shape of generally an annular segment of a circular ring, said ring having a longitudinal axis;
   b) a plurality of brush-seal bristles each having a fixed end and a free end; and
   c) a bristle holder, wherein said fixed ends of said bristles are fixedly-attached to said bristle holder and wherein said bristle holder is rotatably-attached to said housing.

2. The brush seal segment of claim 1, wherein said bristle holder has an axis of rotation which lies in a plane which is generally perpendicular to said longitudinal axis.

3. The brush seal segment of claim 2, wherein the rotation of said bristle holder about said axis of rotation is limited between first and second positions, wherein said free ends of said bristles are disposed closer to said longitudinal axis in said first position than in said second position.

4. The brush seal segment of claim 3, also including a spring which contacts said bristle holder and said housing and which biases said bristle holder towards second position.

5. A brush-seal bristle assembly for installation in a brush-seal housing having a shape of generally an annular segment of a circular ring, wherein the ring has a longitudinal axis, and wherein said brush-seal bristle assembly comprises:
   a) a plurality of brush-seal bristles each having a fixed end and a free end; and
   b) a bristle holder, wherein said fixed ends of said bristles are fixedly-attached to said bristle holder and wherein said bristle holder is rotatably-attachable to said housing.

6. The brush-seal bristle assembly of claim 5, wherein said bristle holder, when rotatably-attached to said housing, has an axis of rotation which lies in a plane which is generally perpendicular to the longitudinal axis.

7. A rotary machine comprising:
   a) a rotor having a longitudinal axis;
   b) a stator casing generally coaxially aligned with said longitudinal axis, circumferentially surrounding and radially spaced apart from said rotor, and including an inner circumferential channel generally coaxially aligned with and open to said rotor;
   c) a brush seal segment including:
      (1) a brush-seal housing having a shape of generally an annular segment of a circular ring, said ring generally coaxially aligned with said longitudinal axis and said housing engagingly disposed in said channel;
      (2) a plurality of brush-seal bristles each having a fixed end and a free end; and
      (3) a bristle holder, wherein said fixed ends said bristles are fixedly-attached to said bristle holder and wherein said bristle holder is rotatably-attached to said housing.

8. The rotary machine of claim 7, wherein said bristle holder has an axis of rotation which lies in a plane which is generally perpendicular to said longitudinal axis.

9. The rotary machine of claim 8, wherein the rotation of said bristle holder about said axis of rotation is limited between first and second positions, wherein said free ends of said bristles are disposed closer to said longitudinal axis in said first position than in said second position.

10. The rotary machine of claim 9, also including a spring which contacts said bristle holder and said housing and which rotationally biases said bristle holder towards said second position.

11. The rotary machine of claim 10, wherein said bristle holder has a backing plate and an upstream plate, wherein said bristles are disposed between said backing plate and said upstream plate, wherein said spring contacts said backing plate, and wherein said upstream plate is disposed such that steady-state operation of said rotary machine generates fluid pressure which is exerted against said upstream plate to overcome said spring rotational bias and to rotationally bias said bristle holder towards said first position.

12. The rotary machine of claim 10, wherein steady-state operation of said rotary machine generates fluid pressure which is exerted against at least one of said bristle holder and said plurality of bristles to overcome said spring rotational bias and to rotationally bias said bristle holder towards said first position.

* * * * *